United States Patent

[11] 3,593,296

[72] Inventors Pierre Girard
Paris;
Marc Jean Pierre Leger, Issy-Les-Moulineaux; Claude Paul Henri Lerouge, Maurepas (Yvelines); Jacques Henri De Jean, Ris-Orangis, all of, France
[21] Appl. No. 819,700
[22] Filed Apr. 28, 1969
[45] Patented July 13, 1971
[73] Assignee International Standard Electric Corporation
New York, N.Y.
[32] Priority Apr. 30, 1968
[33] France
[31] 150086

[54] ELECTRONIC MULTISELECTOR
4 Claims, 4 Drawing Figs.

[52] U.S. Cl. 340/166, 179/18 GF
[51] Int. Cl. H04q 9/00
[50] Field of Search 340/166; 179/18.7 YA, 18 BA

[56] References Cited

UNITED STATES PATENTS

| | | | |
|---|---|---|---|
| 3,118,973 | 1/1964 | Kasper et al. | 179/18.7 YA |
| 3,177,291 | 4/1965 | Porter | 179/18.7 YA |
| 3,185,772 | 5/1965 | Edstrom | 179/18 AB |
| 3,249,699 | 5/1966 | Mol et al. | 179/18 AB |
| 3,435,138 | 3/1969 | Borkan | 340/166 X |
| 3,465,293 | 9/1969 | Weckler | 340/166 |

*Primary Examiner*—Donald J. Yusko
*Attorneys*—C. Cornell Remsen, Jr., Walter J. Baum, Percy P. Lantzy, J. Warren Whitesel, Delbert P. Warner and James B. Raden

ABSTRACT: An electronic multiselector employs metal-oxide-silicon FET transistors in logic circuits comprising NOR gates and inverters. Horizontal selection signals are delivered by a shift register which provides line scanning in a selection stage.

P. GIRARD
M.J.P LEGER
C.P.H. LEROUGE
J.H. De JEAN
Inventors

By O. B. Warner
Attorney

ELECTRONIC MULTISELECTOR

The present patent of addition concerns improvements to multiselectors for switching stages in which contacts located at the cross-points are replaced by field-effect transistors and in which the said contacts are maintained in closed position electronically.

It is a well-known fact that field-effect or FET transistors, and in particular, metal-oxide-silicon FET transistors or "MOS transistors," have interesting characteristics when used as contact elements. In fact, the drain-source resistance of a MOS transistor, which constitutes the switched contact, is strictly voltage controlled so that there is a very good insulation of the control circuit with regard to the energized circuit.

Moreover, in this type of transistor, the drain-source resistance is higher than $10^7$ ohms in the "high-impedance off" state and as low as 100 to 300 ohms in the "low impedance on" state which ensures very good operating characteristics as a contact element.

Another advantage of a multiselector equipped with MOS transistors as contact components lies in the fact that the selection and control circuits can also be designed with MOS transistors, both as regards the active components and the resistors. Consequently, multiselector matrices can be made with a capacity of 4×2, 4×4, 4×8 etc...cross-points in large scale integrated circuits which may comprise several hundred MOS transistors.

The object of the present invention is therefore to realize an elementary electronic multiselector in large scale integrated circuit.

It is a feature of the invention that a switching circuit is located at each cross-point between two perpendicular speech conductors made up of a vertical *j* and a horizontal *k* of the multiselector, that said circuit comprises first a contact element made up of a MOS transistor the source and drain of which are connected, respectively to exemplary conductors the vertical *j* and to the horizontal *k* and second, a holding flip-flop comprising transistors of the same type with its 1 output connected to the switching transistor grid so that, when said flip-flop is in the 1 state, the said transistor is conducting ("low impedance on" state) which corresponds to the closing of a pair of contacts connecting conductors *j* and *k*.

Another feature of the invention is that an elementary multiselector matrix comprises *m* verticals and *n* horizontals with which the same number of selection conductors are associated, that the selection of a particular vertical *j* is effected by applying a signal C*j* to the vertical selection conductor *cj*, that the selection of a particular horizontal *k* is effected by applying a signal $\overline{Sk}$ to the horizontal selection conductor *sk*, that the matrix also comprises *n* "busy state" conductors *e*1, *e*2...*ek*...*en* associated with the horizontals, a signal *Ek* appearing on conductor *ek* when at least one contact is closed to said horizontal, that in the rest position, signals $\overline{Cj}$ and S*k* are applied to the selection inputs to ensure that the position of the holding flip-flop remains unchanged and that an inverter circuit to which signal C*j* is applied delivers a signal $\overline{C'j}$ delayed by a time *t* which is slightly longer than the switching time of the holding flip-flop.

Another feature of the invention is that, in order to close the switching circuit X*jk*, first the horizontal selection of the said cross-point is effected by applying signal $\overline{Sk}$, second the vertical selection of the said point is effected by applying signal C*j* which controls the opening of all the switching circuits associated with vertical *j* by resetting their holding flip-flops in the 0 state, third signal C*j* is suppressed and signal $\overline{C'j}$ sets in the 1 state the holding flip-flop of the selected switching circuit when signal $\overline{Ek}$ is present, and fourth signal $\overline{Sk}$ is suppressed so that the circuit receives signals $\overline{Cj}$ and S*k* which hold it in rest position.

Another feature of the invention is that the horizontal selection conductors are connected to the corresponding outputs of a shift register into which a code is introduced in series to control the horizontal selection in the matrix.

The above mentioned and other features and objects of this invention will become apparent by reference to the following description taken in conjunction with the accompanying drawings in which.

Figures 2, 4:
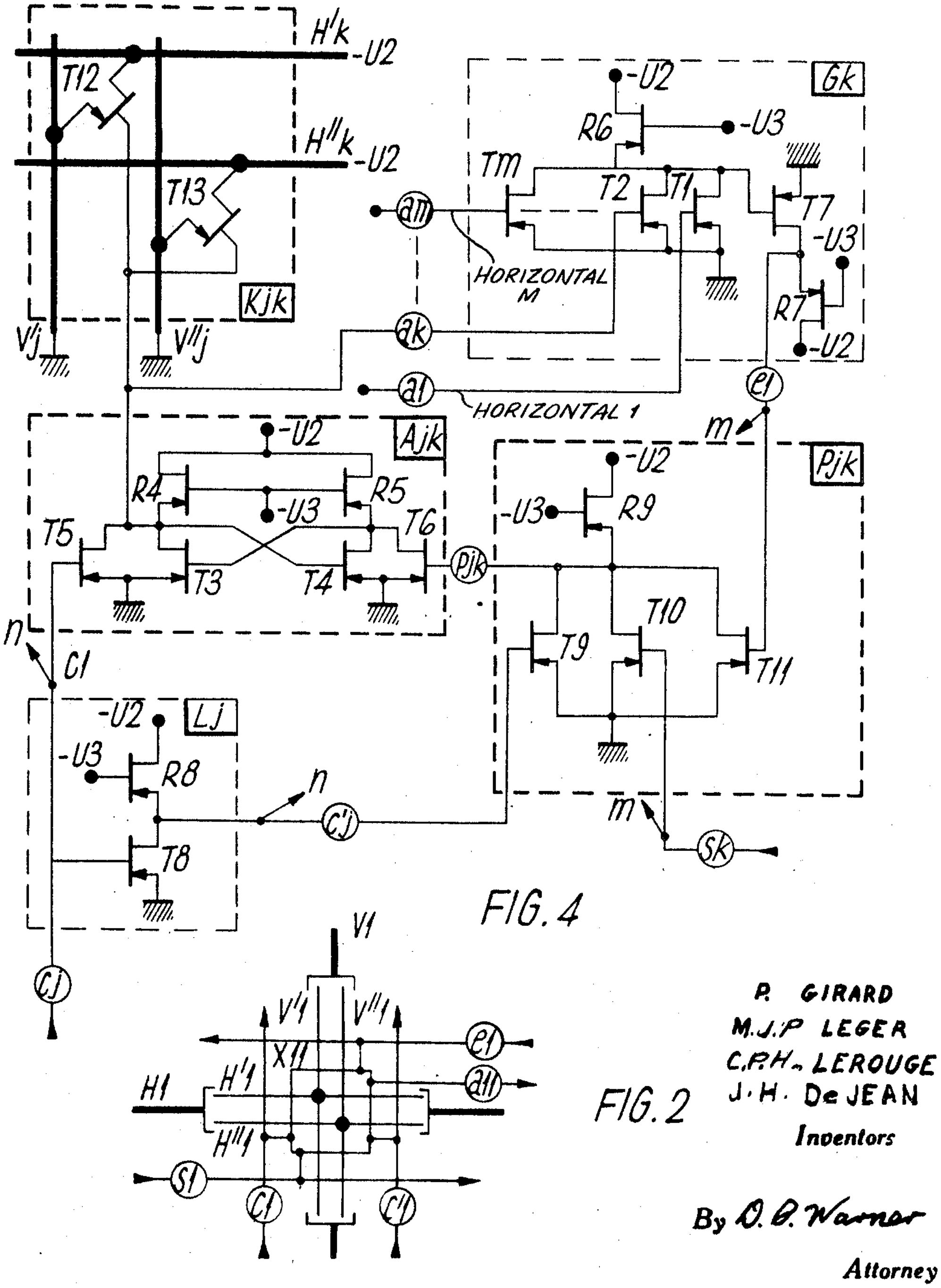
FIG. 2 shows a symbolic diagram of a switching circuit.
FIG. 4 shows a detailed diagram of a switching circuit and its associated circuits.

Before describing the invention, the main features and mode of operation of MOS transistors will be reviewed. All the transistors shown in FIG. 1 (with the exception of transistors T1 and T2) and in FIG. 4 are of this type.

A MOS transistor is almost completely symmetrical and the electrodes which operate as drain and source can be inverted without any disadvantages and without modifying its operation when it is used in logic circuits. Nevertheless the manufacturer defines, in the specifications, the electrodes which play the part of drain and source. Consequently, in the figures, the source is symbolized by an arrow as is the emitter of a bipolar transistor.

The operating voltages of a MOS–Ph transistor (type P, enhancement transistor) are defined as follows:

VT : threshold voltage;

VD : drain voltage;

VG : grid voltage.

All these voltages are measured with reference to that of the source ($VS=0$) and expressed in absolute values. Thus, a MOS transistor is in its "high impedance off" or "blocked" state when $VG \leq VT$. It then has a drain-source resistance RDS whose value is practically infinite (approximately $10^7$ ohms).

A MOS transistor is "on" when $VG > VT$. It then behaves like a passive resistance whose value is $$RDS = \frac{1}{K(VG-VT)} \qquad (1)$$

*K* being a proportionality factor.

In this case there are two "on" regions:

the "low impedance on" region (or nonsaturated region) when $VD < VG-VT$, with a drain-source resistance *RDS* of low value (50 to 200 ohms).

the "high impedance on" region (or saturated region) when $VD \geq VG-VT$, with a resistance *RDS* of relatively high value.

If a MOS-Ph transistor has a threshold voltage of $VT=4$v. and then a voltage $VG=0$ is applied to it, it becomes blocked. If a voltage $VG=-24$v. and a voltage *VD* between zero and −20 volts is applied to said transistor, it sets into the on state. In practice, if good linearity of resistance *RDS* is required, must use lower values of *VD*. The resistance *RDS* then has a very low value and the transistor allows bidirectional transfer of analog or digital signals between drain and source.

MOS transistors are also used as resistors. Consequently large scale integrated circuits can be designed, this passive element operation being practicable for both types of conduction. For instance, if the transistor operates in the "low impedance on" region with a suitable bias ($VD < VG-VT$) and is connected in series with an inverter MOS transistor, either the voltage *VD* or the ground voltage appears at the connection common to both transistors depending on whether said inverter transistor is off ($VG \leq VT$) or on ($VG > VT$).

In the various figures accompanying this description, MOS transistors operating as active components are referenced "T" and those operating as load resistors bear the reference "R."

It is obvious that the use of MOS transistors as load resistors is only feasible where integrated technology is employed in which case they offer advantages from the point of view of manufacture. However, it is obvious that every MOS transistor referenced R and used as a resistor can be replaced by a conventional resistor of the same value.

Figure 1:
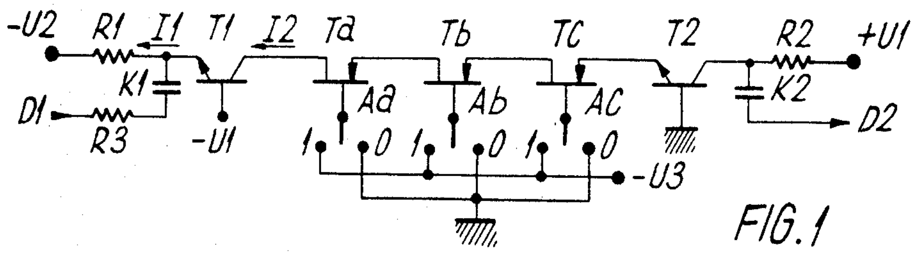
FIG. 1 shows a mode of setting up a speech path in an exchange comprising several selection stages.

We shall first recall with reference to FIG. 1 the mode of setting up a speech path in a switching center comprising, for instance, three selection stages *a*, *b* and *c*. In each of these stages this path uses MOS-Ph transistors T*a*, T*b* and T*c* as well as bipolar NPN transistors T1, T2 located at the ends of the path. Control signals A*a*, A*b* and A*c* are applied to the MOS transistors via the inverters bearing the same references. The signals to be transmitted are applied to the input D1 and collected at the output D2, the coupling being effected by the capacitors K1 and K2.

When the grids of transistors T*a*, T*b* and T*c* reach ground potential (inverters in position 0), said transistors become blocked. When these grids reach potential −U3 (inverters in position 1) the said transistors may be conducting if transistors T1 and T2 are conducting.

We shall describe the operation in DC of the circuit of FIG. 1 assuming that inverters A*a*, A*b* and A*c* are in position 1. It will be assumed that:

$U1=12$ volts;
$U2=18$ volts;
$U3=30$ volts.

The voltage U3 is used, in the circuits of FIG. 4, to set the transistors operating as load resistances in their "low impedance on" region.

Transistor T1 is conducting ("low impedance on" region) with a collector current $I1\cong(U2-U1/R1)$.

Moreover, a potential difference U3 is set up between the grid of transistor T*c* and the base of transistor T2 via the high impedance of the interelectrode capacity and the leakage resistance of transistor T*c* so that both these transistors conduct. Similarly, transistors T*b* and T*a* conduct and a current $I2\cong I1$ flows through them, as well as through T1, the load resistance of transistor T1 then reaching a value of R*e*+3RDS, in which R*e* designates the emitter resistance of transistor T2.

In AC operation transistors T1 and T2 are in common base configuration with a very low input (approximately 10 ohms) and a very high output impedance (approximately 1 megohm). If $\alpha1$ and $\alpha2$ are the current gains of these transistors, and *i*1, *i*2 the AC input and output currents, one has: $i2=\alpha1.\alpha2.i1$. It can therefore be seen that, if high gain bipolar transistors are utilized, the output current differs by only a few percent from the input current and that it is independent from the resistance made up by the saturation resistances of MOS transistors T*a*, T*b* and T*c* connected in series. Since the input impedance of transistor T1 has a very low value, input current *i*1 depends only from the value of resistor R3 which comprises the line impedance. At the output, the load impedance is in parallel with resistor R2 and current *i*2 is shared by these two components according to their conductances.

The above described circuit only allows for transmission of information in one direction, i.e. from D1 to D2, since the reverse voltage transfer ratio *h*12 of bipolar transistors T1 and T2 is very low. To achieve bidirectional transmission, two identical chains equipped with 2 wire—4 wire transformation must be utilized. In each selection stage, each contact element or cross-point comprises then two transistors controlled by the same switch.

FIG. 2 shows a symbolic diagram of such a cross-point designed for matrix assembly. When the cross-point is closed, the speech path is set up, in one direction, between horizontal H'1 and vertical V'1 and, in the other, between horizontal H''1 and vertical V''1. To simplify the figure, the group of two horizontals will hereafter bear the reference H1 and the group of two verticals the reference V1.

The cross-point is controlled by signals applied to the following conductors:

horizontal selection conductor *s*1,
vertical selection conductors *c*1 and *c*'1;
busy line conductors *e*1.

Moreover, a conductor *a*11 transmits information which characterizes the state of the cross-point, namely whether it is open or closed.

Figure 3:
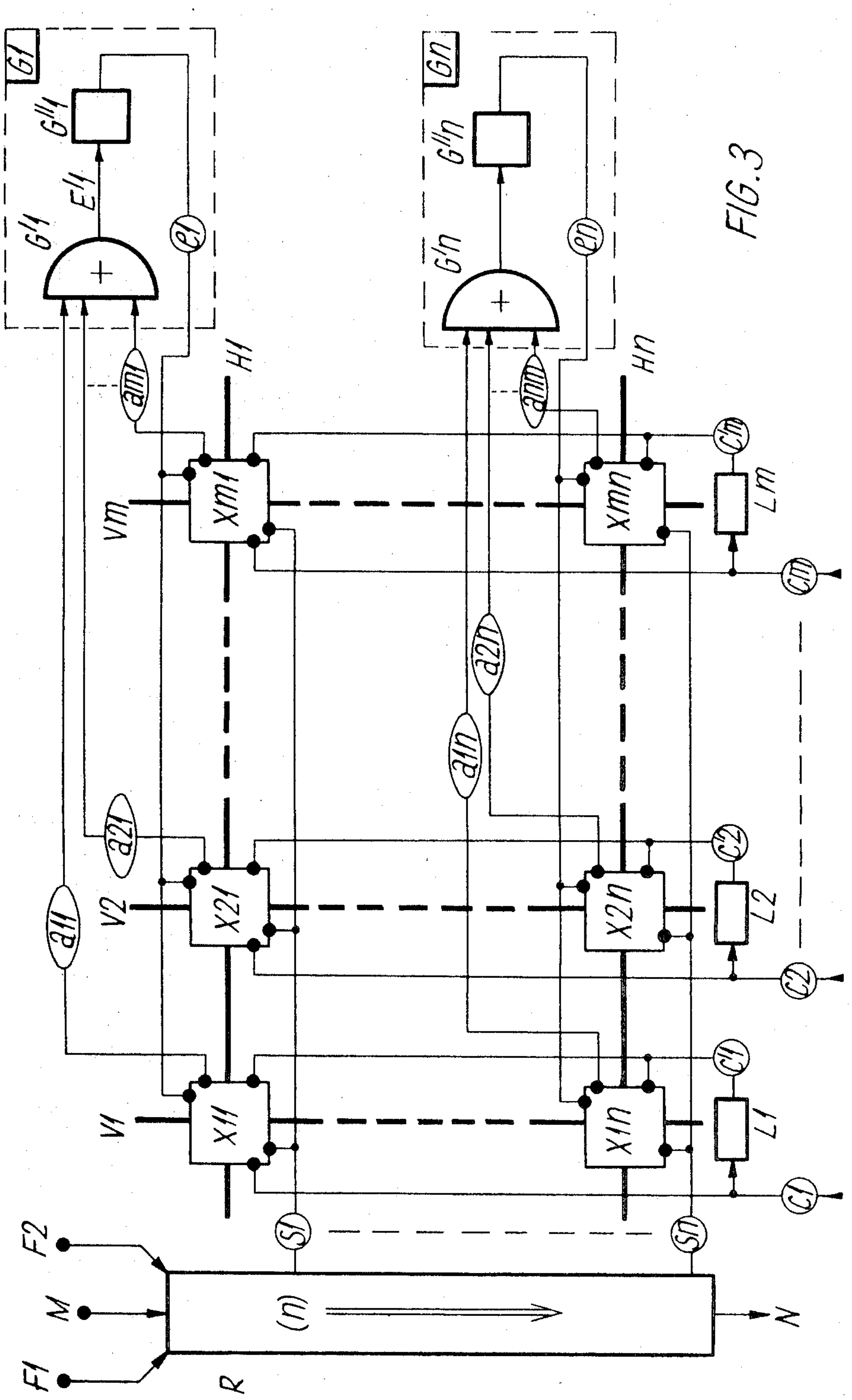
FIG. 3 shows a diagram of an elementary multiselector matrix.

It will be noted that in this figure and in FIGS. 3 and 4, the conductors bear references comprising small letters followed by one or two digits and that they are encircled.

FIG. 3 shows a complete multiselector matrix according to the invention comprising horizontals H1, H2...H*k*...H*n* and verticals V1, V2...V*j*...V*m*.

At each cross-point a switching circuit, like that represented in FIG. 2, is situated. Of the said circuits, those which are associated to horizontal H1 bear references X11, X21...X*m*1 and those associated to horizontal H*n* bear references X1*n*, X2*n*...X*mn*.

Furthermore, the matrix comprises:

a shift register R comprising *n* stages the *n* outputs of which are connected to the horizontal selection conductors *s*1, *s*2...*sk*.... This register is also made with MOS-Ph transistors and can be, by way of an example, a dynamic shift register. Such a register, which comprises clock inputs F1, F2, signal input M and signal output N, enables to control the horizontal selection in the matrix by information applied to input M in series form.

A logic circuit per horizontal, namely, in the case of horizontal H1, circuit G1 comprising NOR circuit G'1 and inverter G''1.

Table I, below, indicates the various signals applied to the control conductors (signals bearing references in capital letters) as well as the corresponding voltage levels and the designation of said signals.

TABLE I

| Conductor | Signal | Voltage | Designation |
|---|---|---|---|
| *c* | $\overline{C}$ | 0 | |
| | C | −U2 | Connection signal. |
| *c*' | $\overline{C'}$ | 0 | Delayed connection signal. |
| | C' | −U2 | |
| *s* | $\overline{S}$ | 0 | |
| | S | −U2 | Non-selection signal. |
| *e* | $\overline{E}$ | 0 | |
| | E | −U2 | Busy signal. |
| *a* | $\overline{A}$ | 0 | |
| | A | −U2 | Closing signal. |
| *p* | $\overline{P}$ | 0 | |
| | P | −U2 | Preselection signal. |

For the purpose of simplification, the references of the conductors and signals, in this table, do not bear the digits identifying the horizontal and the vertical to which each cell is associated.

As can be seen from the table, a signal of amplitude −U2 applied to selection conductor *sk* characterizes the nonselection of horizontal H*k*. Moreover, if it is assumed that the signals applied to input M of register R are negative logic signals, as are all the other signals, digits 1 and 0 are characterized by levels −U2 and zero respectively.

Consequently, in a matrix comprising, for instance, four horizontals H1 to H4, line H3 is selected by the transmission, in series form, of the binary number 1011.

The circuit G'1 delivers a signal E'*k* of amplitude −U2 for the logic condition $E'1=\overline{A11+A21+...Am1}$.

The inverter G''1 delivers a signal E1 of amplitude −U2 for the logic condition $E1=A11+A21+...Am1$.

Signal E1 therefore indicated that at least one switching circuit associated to the horizontal H1 is closed: it will hereafter be called *busy signal*.

The connection signal C1 transmitted by the vertical selection conductor *c*1 to the circuits associated to vertical V1 is also applied to inverter circuit L1 which delivers signals $\overline{C'1}$, C'1. The switching time of the MOS transistor used to invert the signal has a value *t* and, for instance, when the connection signal is suppressed (transition from condition C1 to condition $\overline{C1}$) signal $\overline{C'1}$ remains present for a time *t*.

FIG. 4 shows a detailed diagram of one of the switching circuits X11, X21, etc. of FIG. 3. Such a circuit which, is labeled X$jk$, comprises the bidirectional cross-point K$jk$, its control circuit comprising the flip-flop A$jk$ and the NOR circuit P$jk$. The figure also shows a detailed diagram of the logic circuit G$k$ associated to horizontal H$k$ and of the delay circuit L$j$ associated to the vertical V$j$.

In the circuit G$k$, the NOR circuit G'$k$ *of FIG. 3 comprises the MOS–Ph transistors T1, T2* ...T$m$ connected in parallel and R6 and the inverter G''$k$ comprises the MOS–Ph transistors T7 and R7. Similarly, the inverter L$j$ comprises the MOS–Ph transistors T8 and R8.

The NOR circuit P$jk$ which comprises the MOS–Ph transistors T9, T10, T11, R9 is identical to the circuit G'$k$ and delivers a preselection signal P$jk$ of amplitude—U2 for the logic condition: $Pjk=\overline{C'j+Sk+Ek}=\overline{C'j}.\overline{Sk}\overline{Ek}$.

It can be seen therefore, by referring to table I, that a preselection signal P$jk$ is only present when the following three conditions are simultaneously fulfilled:

The horizontal H$k$ is free (condition $\overline{Ek}$)

The horizontal H$k$ is selected (condition $\overline{Sk}$)

A delayed connection signal is present (condition $\overline{C'j}$).

The cross-point K$jk$, located at the intersection of horizontals H', H'' and of verticals V', V'' effects the connection between conductors H'$k$—V'$j$ and H''$k$—V''$j$ when the MOS–Ph transistors T12 and T13 are conducting. The control signal A$jk$ applied to the grids of the said transistors is delivered by the flip-flop bearing the same reference. This holding flip-flop comprises the MOS–Ph transistors T3, T4, T5, T6, R4 and R5.

The operation of such a flip-flop in which transistors T5 and T6 are used to control the switching, is similar to that of a flip-flop equipped with PNP bipolar transistors and will not be described in detail.

Table II, below, indicates the state of transistors T3 and T4 when the flip-flop is in the 1 and in the 0 states as well as the state of the cross-point K$jk$ and the drain voltages of said transistors.

The grids of control transistors T5 and T6 are either brought to potential—$U2$ (logic conditions C$j$, P$jk$) or to ground potential (logic conditions $\overline{Cj}$, $\overline{Pjk}$). It can be seen that, for the logic condition C$j$, transistor T5 is conducting and that flip-flop A$jk$ is set in the 0 state (logic condition $\overline{Ajk}$) and that, in condition P$jk$, it is set in the 1 state (logic condition A$jk$).

It will be noted that if transistors T5 and T6 are simultaneously conducting through the application of signals C$j$ and P$jk$, the drains of transistors T3 and T4 are both brought to ground potential and that a signal $\overline{Ajk}$ appears.

TABLE II

| State of the flip-flop | State of the transistors | | | Voltage levels | |
|---|---|---|---|---|---|
| | T3 | T4 | State of the cross-point | Output 1 (drain of T3) | Output 0 (drain of T4) |
| 1 state | Blocked | Conducting | Closed | −U2 (signal Ajk) | 0 |
| 0 state | Conducting | Blocked | Open | 0 (signal $\overline{Ajk}$) | −U2 |

There follows a description—with reference to table II—of the operation of the multiselector of FIG. 3. This description is divided into two parts; the first deals with the effect of the control signals on a nonselected cell and the second describes a specific process for closing the switching circuit X$jk$ located at intersection between vertical V$j$ and horizontal H$k$.

1. Nonselected cells

The lines referenced 1.1, 1.2, 1.3 in table III indicate the signals and voltages on conductors $c$, $c'$, $s$, $e$ and $p$ (NOR circuit P$jk$ output, FIG. 4) in the following cases:

1.1 Rest state (table III, reference 1.1)

In the rest state, i.e. when neither the opening or closing of circuit K$jk$ is effected, signals $\overline{Cj}$ and S$k$ are applied to the selection inputs as well as a signal $\overline{Ek}$ or E$k$. Signal $\overline{Cj}$ blocks the control transistor T5 of the flip-flop A$jk$ and signals S$k$ and C'$j$ block the gate P$jk$ so that the flip-flop is held in position regardless of the voltage level on conductor *ek*.

It will be noted that, if signal $\overline{Sk}$ is applied when transistor T5 has been receiving signal $\overline{Cj}$ for at least a duration $t$, signal C'$j$ still blocks gate P$jk$,

TABLE III

| Ref. | Operation | Conductors $c$ | $c'$ | $s$ | $e$ | $p$ | Flip-flop |
|---|---|---|---|---|---|---|---|
| 1.1 | Rest | $\overline{Cj}$ [0] | C'$j$ [−U2] | S$k$ [−U2] | E$k$ or $\overline{Ek}$ | $\overline{Pjk}$ | |
| 1.2 | Vertical half selection | C [−U2] | C' [0] | S [−U2] | E or $\overline{E}$ | $\overline{P}$ | →$\overline{A}$ |
| 1.3 | Horizontal half selection | $\overline{C}$ [0] | C' [−U2] | $\overline{S}$ [0] | E or $\overline{E}$ | $\overline{P}$ | |
| 2.1 | Horizontal selection | $\overline{Cj}$ [0] | C'$j$ [−U2] | $\overline{Sk}$ [0] | $\overline{Ek}$ [0] | $\overline{Pjk}$ | |
| 2.2 | Vertical selection | C$j$ [−U2] | $\overline{C'j}$ [0] | $\overline{Sk}$ [0] | $\overline{Ek}$ [0] | P$jk$ | →$\overline{Ajk}$ |
| 2.3a | Closing | $\overline{Cj}$ [0] | $\overline{C'j}$ [0] | $\overline{Sk}$ [0] | $\overline{Ek}$ [0] | P$jk$ | →A$jk$ |
| 2.3b | Holding | $\overline{Cj}$ [0] | C'$j$ [−U2] | $\overline{Sk}$ [0] | E$k$ [−U2] | $\overline{Pjk}$ | |

1.2 Application of a connection signal (table III, reference 1.2)

The application of signal C$j$ on the vertical selection conductor *cj* produces the opening of all the cross-points associated to the vertical V$j$. In fact, said signal makes all transistors T5 conducting and flip-flops A are set in the 0 state. Line 1.2 of table III represents the various voltages in the case of nonselected horizontals (signal S).

1.3 Application of a selection signal (table III reference 1.3)

When the horizontal H$k$ is selected by applying the signal $\overline{Sk}$, the nonselected verticals receive a signal $\overline{C}$ and, as can be seen, each gate *P* remains blocked provided that signal $\overline{C}$ has been applied for at least a time $t$ before signal $\overline{Sk}$.

2. Closing of a cross-point

There follows a description, given by way of a nonlimitative example, of a process for closing circuit X$jk$ assuming that the voltages initially applied corresponded to the rest state (table III, reference 1.1) and that the horizontal H$k$ is free, i.e. that a signal $\overline{Ek}$ is standing on conductor *ek*. The said closing process comprises the following operations carried out in time succession.

2.1 Horizontal selection (table III, ref. 2.1)

Signal $\overline{Sk}$ is applied to conductor *sk*. As signal C'$j$ is present, gate P$jk$ is blocked and flip-flop A$jk$ does not switch.

2.2 Vertical selection

A signal C$j$ is applied to conductor *cj* so that flip-flop A$jk$ resets in the 0 state (condition $\overline{Ajk}$). After a delay $t$, circuit L$j$ delivers a signal $\overline{C'j}$ and, if the horizontal is free—this being characterized by the signal $\overline{Ek}$—, signal P$jk$ appears so that the drains of transistors T3 and T4 are both grounded (table III, ref. 2.2). Transistors T12 and T13 (FIG. 4) are blocked and the cross2point is still open (condition $\overline{Ajk}$).

2.3 Closing of the cross-point

The signal Cj is suppressed (condition $\overline{Cj}$) however, signal $\overline{C'j}$ remains for a time t. Transistor T3 is therefore blocked whereas transistor T4 remains conducting under the control of the signal Pjk (table III, ref 2.3a).

Consequently flip-flop Ajk is set in the 1 state (condition Ajk) making transistors T12 and T13 conducting: the cross-point is closed and a signal Ek appears which blocks the gate Pjk (signal $\overline{Pjk}$). After a time t, signal B'j is also produced (table III, ref. 2.3b): the cross-point is held in a closed position.

2.4 End of operation

The signal $\overline{Sk}$ is suppressed (condition Sk) and the device is at rest. (table III ref. 1.1).

While the principles of the above invention have been described in connection with specific embodiments and particular modifications thereof it is to be clearly understood that this description is made by way of example and not as a limitation of the scope of the invention.

In particular, opposite polarity transistors can be used by inverting the polarities of the power supply sources.

We claim:

1. An electronic switching circuit comprising a matrix formed by a first plurality of conductors and a second plurality of conductors intersecting at a plurality of cross-points, each cross-point including an MOS transistor having grid and source and drain electrodes, means coupling said source and drain electrodes to conductors which are to be interconnected, each cross-point comprising a control circuit including a flip-flop having 1 and 0 outputs and incorporating MOS transistors, means coupling the 1 output of each said flip-flop to the grid electrode of an MOS transistor causing it to conduct when the flip-flop is in the 1 state and causing it to block when the flip-flop is in the 0 state.

2. An electronic switching circuit as claimed in claim 1, in which there are means individual to each of said first plurality of conductors for resetting the flip-flop by applying a connection signal to its input and an electronic gate is coupled to each of the conductors of said first plurality for setting the flip-flop by applying a setting signal when the gate receives signals indicating resetting is in order.

3. An electronic switching circuit as claimed in claim 1 in which the first and second pluralities of conductors in the matrix comprise respectively *m* verticals and *n* horizontals with which the respective selection conductors are associated, means coupled to each conductor of said first plurality for accepting a signal over a selected horizontal to establish conditions for closure of the corresponding cross-point, said matrix including *m* delay conductors coupled to the verticals and *n* busy state conductors coupled to the horizontals and means supplying signals over respective delay conductors and busy state conductors to hold the flip-flop in an unchanged status.

4. An electronic switching circuit as claimed in claim 1, in which there is a shift register commonly coupled to the conductors of said second plurality whereby outputs of said shift register are employed to control selections in the matrix.